United States Patent [19]
Hachey et al.

[11] Patent Number: 5,750,191
[45] Date of Patent: May 12, 1998

[54] RETROREFLECTIVE ELEMENTS

[75] Inventors: Kathleen A. Hachey; Larry K. Stump, both of Hudson, Wis.; Terrance L. Beseup, Woodbury, Minn.; Thomas V. Kusilek, River Falls, Wis.

[73] Assignee: Minnesota Mining and Manufacturing Company, St. Paul, Minn.

[21] Appl. No.: 503,532

[22] Filed: Jul. 18, 1995

Related U.S. Application Data

[60] Continuation-in-part of Ser. No. 418,514, Apr. 7, 1995, Pat. No. 5,571,362, which is a division of Ser. No. 247,056, May 20, 1994, Pat. No. 5,417,515.

[51] Int. Cl.$^6$ ............................................. B05D 3/06
[52] U.S. Cl. ..................... 427/163.4; 427/185; 427/242; 427/316
[58] Field of Search ........................ 427/163.4, 316, 427/185, 242

[56] References Cited

U.S. PATENT DOCUMENTS

| | | | |
|---|---|---|---|
| 2,043,414 | 6/1936 | Korff | 88/79 |
| 2,379,741 | 7/1945 | Palmquist | 88/82 |
| 2,407,680 | 9/1946 | Palmquist et al. | 88/82 |
| 2,440,584 | 4/1948 | Heltzer et al. | 88/82 |
| 2,567,233 | 9/1951 | Palmquist et al. | 88/82 |
| 2,793,136 | 5/1957 | Root | 117/33 |
| 2,865,266 | 12/1958 | Wynn | 94/1.5 |
| 3,005,382 | 10/1961 | Weber | 88/82 |
| 3,043,196 | 7/1962 | Palmquist et al. | 88/82 |
| 3,171,827 | 3/1965 | De Vries et al. | 260/40 |
| 3,175,935 | 3/1965 | Vanstrum | 156/3 |
| 3,190,178 | 6/1965 | McKenzie | 88/82 |
| 3,274,888 | 9/1966 | Vanstrum et al. | 88/82 |
| 3,410,185 | 11/1968 | Harrington | 94/22 |
| 3,418,896 | 12/1968 | Rideout | 94/1.5 |
| 3,556,637 | 1/1971 | Palmquist | 350/105 |

(List continued on next page.)

FOREIGN PATENT DOCUMENTS

| | | |
|---|---|---|
| 0 291 205 | 11/1988 | European Pat. Off. |
| 0 565 765 A2 | 10/1993 | European Pat. Off. |
| 2 085 900 | 12/1971 | France . |
| 2 221 583 | 10/1974 | France . |
| 42 07 210 A1 | 9/1993 | Germany . |
| 42 29 289 A1 | 3/1994 | Germany . |
| 2 007 536 | 5/1979 | United Kingdom . |
| WO 93/18233 | 9/1993 | WIPO . |

OTHER PUBLICATIONS

James, J.G., and Hayward, A.T.J., "A Note on the Principles of Reflectorised Road–Marking Materials," *Roads and Road Construction,* Apr. 1960, pp. 122–123.

Wicks, Zeno W. Jr. et al., *Organic Coatings, Science and Technology,* vol. 2, Chapter XXXI, 1994 (no mo.).

Stoudt, M.D. and Vedam, K., "Retroreflection from spherical glass beads in highway pavement markings. 1: Specular reflection," *Applied Optics,* vol. 17, No. 12, 15 Jun. 1978, pp. 1855–1858.

DuPont Product Brochure, "Nucrel 699", Nov. 1986.

Dow Chemical Product Brochure, "Primacor 3460," Form No. 305-1283-337 (no date).

Dow Chemical Product Brochure, "Primacor 3440," Form No. 305-1145-887 (no date).

Dow Chemical Product Brochure, "Primacor 3150,"Form No. 305-1265-887 (no date).

Dow Chemical Product Brochure, "Primacor E/C Polymers," Form No. 305-1563-1087 (no date).

*Primary Examiner*—Janyce Bell
*Attorney, Agent, or Firm*—Gary L. Griswold; Walter N. Kirn; Robert H. Jordan

[57] ABSTRACT

A process and retroreflective elements are provided. The process of preparing a retroreflective element includes the steps of (a) combining a bed of optical elements and one or more core elements comprising a thermoplastic material; and (b) agitating the combination of optical elements and core elements for a sufficient period of time and at a sufficient temperature to coat the optical elements onto the core elements to form retroreflective elements.

22 Claims, 1 Drawing Sheet

U.S. PATENT DOCUMENTS

| | | | |
|---|---|---|---|
| 3,614,199 | 10/1971 | Altman | 359/540 |
| 3,700,305 | 10/1972 | Bingham | 359/540 |
| 3,758,192 | 9/1973 | Bingham | 359/540 X |
| 3,832,038 | 8/1974 | Johnson | 359/534 X |
| 3,849,351 | 11/1974 | Jorgensen | 260/18 N |
| 3,891,451 | 6/1975 | Okazaki et al. | 106/30 |
| 3,935,158 | 1/1976 | Watanabe | 260/42.21 |
| 3,988,645 | 10/1976 | Luxa et al. | 317/62 |
| 3,989,775 | 11/1976 | Jack et al. | 264/1 |
| 4,020,211 | 4/1977 | Eigenmann | 428/323 |
| 4,145,112 | 3/1979 | Crone et al. | 404/14 K |
| 4,203,878 | 5/1980 | Bauer | 260/18 EP |
| 4,328,274 | 5/1982 | Tarbutton et al. | 428/149 |
| 4,564,556 | 1/1986 | Lange | 428/325 |
| 4,569,857 | 2/1986 | Tung et al. | 427/163.4 |
| 4,721,649 | 1/1988 | Belisle et al. | 428/325 |
| 4,758,469 | 7/1988 | Lange | 428/325 |
| 4,763,985 | 8/1988 | Bingham | 359/536 X |
| 4,772,511 | 9/1988 | Wood et al. | 428/325 |
| 4,856,931 | 8/1989 | Bollag | 404/75 |
| 4,937,127 | 6/1990 | Haenggi et al. | 428/148 |
| 4,957,335 | 9/1990 | Kuney, Jr. | 359/541 |
| 4,983,458 | 1/1991 | Dejaiffe | 428/402 |
| 4,988,541 | 1/1991 | Hedblom | 427/163 |
| 4,988,555 | 1/1991 | Hedblom | 428/172 |
| 5,053,253 | 10/1991 | Haenggi et al. | 427/204 |
| 5,094,902 | 3/1992 | Haenggi et al. | 428/150 |
| 5,124,178 | 6/1992 | Haenggi et al. | 427/204 |
| 5,194,113 | 3/1993 | Lasch et al. | 156/243 |
| 5,227,221 | 7/1993 | Hedblom | 428/172 |
| 5,268,789 | 12/1993 | Bradshaw | 359/534 |
| 5,286,682 | 2/1994 | Jacobs et al. | 501/34 |
| 5,417,515 | 5/1995 | Hachey et al. | 404/15 |

RETROREFLECTIVE ELEMENTS

CROSS-REFERENCE TO RELATED APPLICATIONS

The present application is a continuation-in-part of U.S. patent application Ser. No. 08/418,514, filed Apr. 7, 1995, now U.S. Pat. No. 5,571,362, which is a divisional of U.S. patent application Ser. No. 08/247,056, filed May 20, 1994, now issued as U.S. Pat. No. 5,417,515, issued May 23, 1995, which is incorporated herein by reference.

BACKGROUND OF THE INVENTION

Pavement markings of various forms (e.g., paints, tapes, and individually mounted articles) are well known to guide and direct motorists as they travel along a highway. During the daytime, the markings, which are typically of selected distinctive color(s), may be sufficiently visible under ambient light to effectively signal and guide a motorist. At night, however, especially when the primary source of illumination is the motorist's vehicle headlights, the colors of the markings are generally insufficient to adequately guide a motorist. For this reason, pavement markings with retroreflective properties have been employed.

Many retroreflective pavement markings, such as lane lines on highways, are made by dropping retroreflective elements, such as glass beads, onto the line while it is still tacky so the elements become partially embedded therein. Others are made by securing retroreflective elements to a rubber base sheet that contains pigments and fillers either by embedding them into the base sheet or by securing them to the base sheet with a binder. Pigments and fillers typically are dispersed throughout the base sheet for a number of reasons, including reducing cost, improving durability, and providing conformability. Pigments can also be placed in the bonding material to enhance visibility of the pavement marking and as part of the retroreflective mechanism.

Light that is incident upon a retroreflective pavement marking is retroreflected in the following manner. First, the incident light passes through the retroreflective elements to strike the pigments in the base sheet or in the bonding material. The pigments then scatter the incident light, and the retroreflective elements redirect a portion of the scattered light back in the direction of the light source. If the retroreflective elements are embedded too far into the base sheet or material forming the lane line, for example, the retroreflection is typically diminished. Thus, for effective retroreflection from pavement markings, the retroreflective elements are preferably elevated somewhat above the surface of the pavement.

This can be accomplished by using a patterned base sheet and selectively applying a bonding material to the patterned protruberances so the retroreflective elements are secured exclusively to the protruberances where they are most effective. Examples of such pavement markings are disclosed in U.S. Pat. Nos. 5,227,221; 4,988,555; and 4,988,541. This can also be accomplished by using retroreflective elements having a core material that is coated with a multiplicity of reflectors, such as glass spheres. Examples of such elements (which are referred to as aggregates or particles) are disclosed in EP Patent No. 565,765 A2; and U.S. Pat. Nos. 3,043,196; 3,171,827; 3,175,935; 3,274,888; 3,418,896; 3,556,637; and 4,983,458. In some of these retroreflective elements, the reflectors (i.e., optical elements) are also in the body of the elements.

Although many of these elements are extremely useful, some do not utilize an effective means of bonding the reflectors to the core material. Furthermore, some are not easily manufactured. Thus, a need still exists for other retroreflective elements.

SUMMARY OF THE INVENTION

The present invention provides a process of preparing a retroreflective element comprising: (a) combining a bed of optical elements and one or more core elements comprising a thermoplastic material; and (b) agitating the combination of optical elements and core elements for a sufficient period of time and at a sufficient temperature to coat the optical elements onto the core elements to form retroreflective elements. Preferably, the step of agitating is carried out for a sufficient period of time and at a sufficient temperature to embed the optical elements into the core elements to an average depth of at least about 50% of the average diameter of the optical elements. In particularly preferred embodiments, the core elements further comprise a thermoset resin.

Another embodiment of the present invention is a retroreflective element comprising: (a) a core element comprising an elastic thermoplastic material; and (b) optical elements coated on the core element wherein greater than about 50% of the projected surface area of the core element is covered with optical elements. Preferably, the optical elements are embedded into the core element to an average depth of at least about 50% of the average diameter of the optical elements.

Yet another embodiment of the present invention is a retroreflective element comprising: (a) a core element comprising a thermoplastic material selected from a group consisting of a copolymer of ethylene and acrylic acid, a copolymer of ethylene and methacrylic acid, and combinations thereof; and (b) optical elements coated on the core element wherein greater than about 50% of the projected surface area of the core element is covered with optical elements. The core elements used to prepare the retroreflective elements of the present invention are particularly advantageous because they are capable of undergoing shape changes during processing.

DETAILED DESCRIPTION

Figure 1:
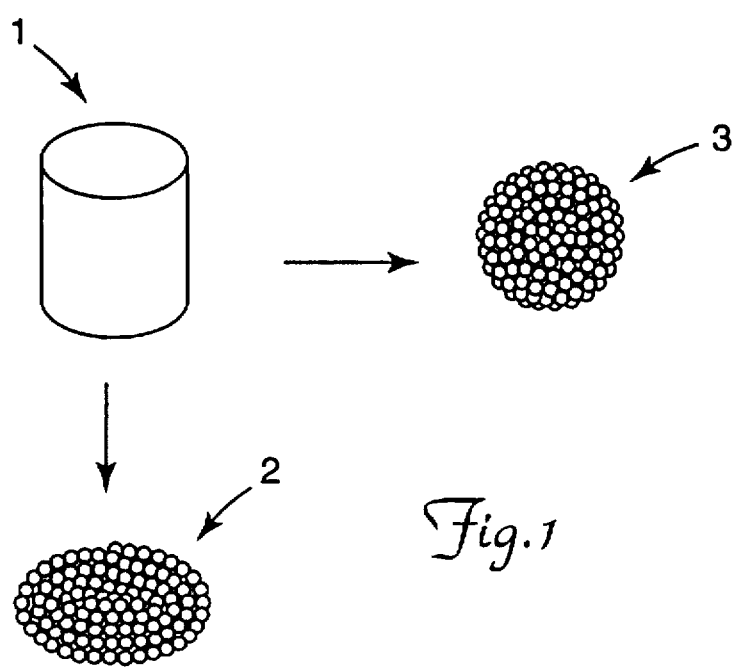
FIG. 1 is a representation of two exemplary shape changes the core elements of the retroreflective elements of the present invention undergo during application of the optical elements.

The present invention provides shaped retroreflective elements and a method of forming them. The retroreflective elements include a layer of optical elements (also referred to herein as reflectors), such as glass beads, partially embedded in the surface of a core of a thermoplastic resin, optionally in combination with a thermoset resin and/or a pigment. These elements are formed by combining solid core elements comprising a thermoplastic resin and optical elements. Preferably, this is done by adding the core elements to a mobile bed of optical elements. The mobile bed of optical elements can be formed in a variety of ways. For example, a mobile bed of optical elements can be formed in a fluidizing chamber or in a rotary kiln. The optical elements are preferably heated to a temperature at least about the tackifying temperature of the core elements. Preferably, the core elements are at room temperature (i.e., 20°–30° C.) and the optical elements are at a temperature at least about 10° C. higher than the tackifying temperature of the core elements.

This method allows substantially immediate attachment of the optical elements to a majority of the surface area (preferably substantially all the surface area) of the core thermoplastic elements. Further heating allows the optical elements to sink to an appropriate level in the thermoplastic elements. The optical element coverage about the core thermoplastic elements provides free movement within the mobile bed of optical elements. Furthermore, this process allows for the formation of various shaped retroreflective elements, depending on the choice of thermoplastic resin, pigment, and/or processing conditions established during extruding and cooling of the core resin.

Substantially spherical, disk, and cylindrical shapes are among the possible shaped retroreflective elements that can be produced using the method of the present invention. The core material of a retroreflective element of the present invention can change shape upon coating the optical elements on its surface. Alternatively, depending on the choice of materials, processing conditions, etc., the core material does not substantially change shape. FIG. 1 is a representation of two exemplary shape changes that the core elements of the retroreflective elements of the present invention can undergo during coating of the optical elements. For example, a substantially cylindrical core element (1) can "flatten out" and become substantially disk-like (2) or can simply become slightly "rounded" and become substantially spherical (3) upon coating with optical elements. As used herein, "coating" refers to simply attaching the optical elements to the surface of the core elements without much embedment, as well as attaching and embedding the optical elements into the surface of the core elements.

Each of the shapes can be used for specific advantage in specific applications. For example, a flat disk shaped retroreflective element when used in combination with a ceramic optical element is very durable and wear-resistant and envisioned to be useful in liquid maintenance markings. Spherical retroreflective elements can be incorporated into oven-coated tapes used as pavement markings by dropping them onto tape products and heating them until they form a dome-shape.

The retroreflective elements of the present invention are substantially covered by optical elements. That is, the surface of the retroreflective elements do not contain major portions that are void of optical elements, although the optical elements do not necessarily need to be closely packed. That is, for any one retroreflective element, greater than about 50% of the projected surface area of the core element is covered by optical elements. Preferably, greater than about 60% of the projected surface area is covered, and more preferably greater than about 90% is covered. Most preferably, the optical elements are closely packed on the surface of the core elements. As used herein, "projected" surface area refers to the apparent area of the surface looking perpendicular at the retroreflective element.

Resin Materials

The core elements of the present invention include a thermoplastic material. This thermoplastic material can be any of a wide variety of materials that have functional groups capable of interacting with the optical elements for effective bonding. Examples of such functional groups include acids, amides, amines, and the like. The thermoplastic material is preferably one that is elastic. That is, at the process melt conditions the core elements made from the thermoplastic material are elastic so the shape of the resultant retroreflective elements can be controlled by the process conditions, e.g., extrusion temperature, cooling rate, and cooling temperature established during the extruding and cooling of the core resin. By this it is meant, for example, that the thermoplastic material is one that is elastic when combined with the optional materials described herein, e.g., pigment, at the melting temperature of the combination.

Typically, the shape of the retroreflective elements results from a balance of melt elasticity and surface energetics. That is, for a material to form a rounded element, the conditions of forming the core element should be chosen such that it relaxes substantially completely before it is contacted with the optical elements. Upon reheating in the presence of the optical elements, surface tension will cause the pellet to become rounded. Thus, little internal polymer memory is generated during extruding and cooling the strand.

For a material to form a disk-like or flattened element, the conditions of forming the core element should be chosen such that there is some memory built into the material. Upon reheating in the presence of the optical elements, melt elasticity will cause the pellet to become flattened. This can be accomplished typically by pumping the material faster through a longer extensional flow field to induce more orientation of the molecules, and cooling faster. Typically, a material with a higher molecular weight will have a greater melt elasticity.

Preferred thermoplastic materials include ethylene/acrylic acid copolymers ("EAA") and ethylene/methacrylic acid copolymers ("EMAA"), and mixtures of EAA and EMAA. These materials can be processed to form pellets that undergo a shape transformation. For example, pellets made from EMAA can become rounded as a result of surface energetics during application of the optical elements. In contrast, pellets made from a mixture of EMAA and EAA can become flattened and disk-like during application of the optical elements, as a result of memory frozen into the material during extruding and cooling. EMAA copolymers are commercially available under the tradename NUCREL from E. I. DuPont de Nemours and Company, Wilmington, Del. EAA copolymers are commercially available under the tradename PRIMACOR from Dow Chemical Company, Midland, Minn. Other thermoplastic materials that can be used include, but are not limited to, ethylene n-butyl acrylate, ethylene vinyl acetate, urethane, and mixtures thereof.

Certain retroreflective elements of the present invention also include reactive monomers, i.e., thermoset resins, in the core thermoplastic elements. These materials contribute to the formation of generally tougher retroreflective elements. Typical reactive materials that are useable in the core thermoplastic elements of the present invention include systems normally used in powder coating formulations. Powder coatings are described in *Organic Coatings. Science and Technology*, Chapter 31, by Zeno Wicks, Jr. et al., John Wiley and Sons, Inc., 1994. Examples of such systems include epoxies, polyesters, acrylics, epoxy-functional acrylics, blocked isocyanates in combination with polyols or amines. Such materials can be included within the core thermoplastic elements in an amount that does not interfere with the formation, e.g., extruding and cooling, of the core elements and that does not detrimentally affect embedment of the optical elements.

Optical Elements

A wide variety of optical elements can be used in the retroreflective elements of the present invention. Typically, optical elements having a refractive index of about 1.5–2.6 are used. The optical elements preferably have a diameter compatible with the size, shape, spacing, and geometry of the core thermoplastic element. Typically, optical elements, e.g., microspheres or beads, of about 50–1000 micrometers in diameter may be suitably employed. Preferably, the ratio of the diameter of the optical elements to the diameter of the core elements is no greater than about 1:2. Preferably, the optical elements used have a relatively narrow size distribution for effective coating. Other factors affecting element size are the number of rows of beads desired to be available to vehicle headlights and the particle size of the core material.

Suitable optical elements include glass microspheres (also known as beads or retroreflective beads) formed of glass materials, preferably having indices of refraction of from about 1.5 to about 1.9. Preferred optical elements are disclosed in U.S. Pat. Nos. 4,564,556 and 4,758,469, which are incorporated herein by reference. These optical elements generally described as solid, transparent, nonvitreous, ceramic spheroids comprising at least one crystalline phase containing of at least one metal oxide. The ceramic spheroids also may have an amorphous phase such as silica. The term "nonvitreous" means that the spheroids have not been derived from a melt or mixture of raw materials capable of being brought to a liquid state at high temperatures, like glass. The spheroids are resistant to scratching and chipping, are relatively hard (above 700 Knoop hardness), and are made to have a relatively high index of refraction. These optical elements may comprise zirconia-alumina-silica and zirconia-silica.

To enhance bonding of the optical elements to the core thermoplastic elements, the optical elements can be treated with a coupling agent, such as a silane, titanate, zirconate, and the like. One particularly suitable coupling agent is an aminosilane coupling agent, such as A1100 Silane coupling agent, which is available from Union Carbide Company, Danbury, Conn.

Optional Additives

Other materials can be included within the retroreflective elements of the present invention. These can be materials added to the resin during compounding, added to the resin by the supplier, and/or added to the retroreflective elements during coating with the optical elements. Examples of such materials include pigments, UV stabilizers, heat stabilizers, antioxidants, processing aids, and skid-resistant particles, for example.

A suitable pigment is added to the thermoplastic resin if desired to impart reflection to the resin as well as color and opacity. Typically, about 8–50 weight percent (wt-%) pigment is used in the core elements. The core elements of the retroreflective elements can include specularly reflecting pigments, diffusely reflecting pigments, or both. Diffuse pigments are generally fine particles that are relatively uniform in size. The light hitting the diff-use pigment particles is reflected back at a number of angles, including back along the path of incident light. An example of a diffuse pigment is titanium dioxide. For edge stripping on a highway, for example, a white rutile titanium dioxide or anatase titanium dioxide are typically used.

Specular pigments are generally thin and plate-like. The light hitting the specular pigment particles is reflected back at an angle equal but opposite to, that is, at a mirror image from normal, of the angle at which it entered. Examples of plate-like pigments include, for example, leafing aluminum, mica, nacreous and pearlescent pigments. Such pigments can be used to help maintain the shape of the core element during the application of the optical elements.

Other pigments that may be used to produce white, yellow, or other colored mixtures include aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc., as well as organic yellows such as those described in U.S. Pat. No. 5,286,682. The pigments can be extended with suitable natural or manufactured granular materials.

It is also desirable to include a stabilizing agent in the core thermoplastic element in order to improve resistance to U.V. light and/or heat of the thermoplastic material, pigment, and/or thermoset material. Preferred stabilizing agents are hindered amine light stabilizers (HALS) and may be present at levels up to about 5%. Exemplary HALS stabilizing agents are CHIMASSORB 944 available from Ciba-Geigy Corp., Additives Division, Hawthorne, N.Y., and CRYASORB UV 3346 available from American Cyanamid Co., Wayne, N.J. Other suitable stabilizing agents include, for example, antioxidants such as IRGANOX 1010 and IRGAFOS 168, both of which are available from Ciba Geigy.

Processing aids can also be used in the retroreflective elements of the present invention. Typically, these are added to the core element to enhance processing. That is, when combined with the thermoplastic material and other optional additives in the core element, a processing aid enhances dispersion or mixing. Examples of such processing aids include low molecular weight ethylene acrylic acids, such as that available under the tradename AC540 from Allied Signal, and low molecular weight polyethylene resins, such as that available under the tradename AC16 from Allied Signal.

Typical skid-resistant particles do not play a role in retroreflectivity; rather, they are disposed on retroreflective and non-retroreflective pavement markings to improve dynamic friction between the marking and a vehicle tire. The skid-resistant particles can be, for example, ceramics such as quartz or aluminum oxide or similar abrasive media. Preferred skid-resistant particles include fired ceramic spheroids having a high alumina content such as taught in U.S. Pat. Nos. 4,937,127; 5,053,253; 5,094,902; and 5,124,178, the disclosures of which are incorporated herein by reference. The particles are preferred because they do not shatter upon impact like crystalline abrasive media such as $Al_2O_3$ and quartz. Skid-resistant particles typically have sizes of about 200 to 800 micrometers.

Skid-resistant particles can be combined with the optical elements and coated on the core thermoplastic elements in the same manner as described below for applying the optical elements. Alternatively, skid resistant particles can be applied to the core thermoplastic elements without the optical elements. In this embodiment, the product formed would not be retroreflective. Furthermore, the core element would not necessarily include a pigment.

The retroreflective elements of the present invention can also include core thermoplastic material laminated to retroreflective sheeting material. This combination can then be coated with the optical elements in the same manner as described herein.

Process

The technique of adding solid core elements to a mobile bed of optical elements, preferably hot optical elements, allows substantially immediate optical element attachment to a majority of the surface area of the core thermoplastic elements. By this it is meant that upon visual inspection, either with or without magnification, greater than about 50% of the projected surface area of a core element is covered by the optical elements. Preferably, greater than about 60% of the projected surface area is covered, and more preferably, greater than about 90% of the projected surface area is covered. Further heating allows the optical elements to sink to an appropriate level in the core elements and bond, i.e., embed, firmly therein. Most preferably, the optical elements and core elements are mixed together for a time and at a temperature sufficient to embed the optical elements in the core elements in a generally closely packed arrangement.

The layer of optical elements together with movement of the core elements within the mobile bed reduces the tendency of the core elements melting and fusing to each other or to the container during this process. This problem is further reduced if the optical elements are heated and the core elements are at or below room temperature before they come into contact. This allows the hot optical elements to coat the cool core elements before the heat from the optical elements causes the core elements to become tacky. Once the core elements become coated with optical elements, they are very mobile within the bed of optical elements. This allows further dwell time in the bed of optical elements for heat transfer to achieve effective embedment. The coated core elements, i.e., retroreflective elements, are then removed from the bed of optical elements and allowed to cool thereby fixing the embedded particles at the desired level of embedment in the surface.

Effective embedment typically results from sinking and/or capillation. Capillation is the term used to describe the slight wicking action of the core material around each optical element. This capillation is important because the core material forms a socket-like structure around each optical element and holds it in place. Preferably, for effective binding, the optical elements are embedded on average into the core element to a depth of at least about 50% of their average diameter. That is, for an optical element with a diameter of x, it is embedded into the surface of a core element to a depth of at least about x/2. More preferably, the optical elements are gembedded on average to a depth of at least about 60%. Typically, they are not embedded to a depth of more than about 80% of their average diameter. Although for any one retroreflective element it is desirable to have all optical elements with at least 50% embedment, this is not a necessary requirement. Preferably, as long as at least about 50% of the optical elements are embedded into the core element to a depth of at least about 50% of their average diameter, the retroreflective elements are within the scope of the present invention.

If the retroreflective elements of the present invention are used in applications in which they are heated to a temperature that will melt or tackify the core element, the optical elements can be simply coated on the surface of the core elements without achieving effective embedment. The subsequent heating conditions should be effective to cause embedment of the optical elements to a depth of at least about 50%.

The retroreflective elements are made by forming small pieces, e.g., pellets, of the core thermoplastic material, optionally containing one or more types of thermoset resins and/or pigments. Preferably, this is done by combining the core thermoplastic material, which can be a combination of different thermoplastic materials if desired, the optional thermoset resins, and the optional pigment in an extruder and forming a strand of well mixed material that will be used as the core of the retroreflective elements. The pigment can be premixed with one or more thermoplastic materials and added as pellets of a pigmented thermoplastic material if desired.

The strand is extruded at a temperature above the melt temperature of the thermoplastic material, cooled, and then cut into small pieces, i.e., the "core thermoplastic elements" or simply "core elements." Preferably, the extrusion temperature is not so high above the melt temperature of the thermoplastic material that it is so flowable it doesn't form a self-supporting strand. If an underwater pelletizer is used to form pellets from this strand, higher extrusion temperatures can be used because lower viscosities can be tolerated. Generally, the choice of temperature and time in the extruder is dependent on the materials being combined and the desired shape of the resultant retroreflective elements. These conditions can be readily determined by one of skill in the art. For the preferred thermoplastic materials used herein, extrusion is carried out at a temperature of about 200°–600° F. (93°–316° C.). Extrusion can be carried out in a single screw or twin screw extruder, for example. Typically the rate of extrusion is about 5–200 revolutions per minute (rpm), to achieve the desired pumping rate.

The strand can be cooled by air or in a water bath or by any kind of heat transfer mechanism. Preferably, it is cooled in a water bath at a temperature of less than about 30° C. The cooled strand is then cut into small pieces for coating with the optical elements. These pieces of core elements can be of a wide variety of shapes and sizes. Preferably, they have a "size" of no greater than about 4 inches (10 cm). By this, it is meant that the longest dimension is no greater than about 10 cm. That is, the length is no more than about 10 cm. Preferably, they are in the form of small cylindrically shaped pellets of a length of about 0.06 inch (0.16 cm) to about 4 inches (10 cm), more preferably about 0.06 inch (0.16 cm) to about 1 inch (2.54 cm), and most preferably about 0.06 inch (0.16 cm) to about 0.13 inch (0.32 cm). Pellets can be formed by a wide variety techniques such as chopping, underwater pelletizing, etc.

These pieces of dry (i.e., nontacky) solid core thermoplastic elements are then fed through a mobile bed of optical elements. These optical elements are preferably at a temperature higher than the tackifying temperature of the solid core thermoplastic elements upon initial contact. That is, the optical elements are preferably initially at a temperature that causes surface tackifying of the solid core thermoplastic material to produce effective attachment and embedment of the optical elements. This can be determined readily by one of skill in the art based on knowledge of the melt temperature of the thermoplastic material in the core elements. For the preferred materials used in the solid core thermoplastic elements of the present invention, the optical elements are preferably initially heated to a temperature about 10° C. higher than the tackifying temperature of the core elements for attachment, more preferably at least about 25° C. higher for effective embedment, and most preferably at least about 50° C. higher for effective embedment in a reasonable amount of time.

U.S. Pat. No. 3,418,896 (Rideout) discloses that retroreflective elements can be formed by extruding or otherwise molding a plastic material into the shape of a rod and applying glass spheres to the outer surface of the rods before the material is hardened. The rod is then cut or chopped into pieces forming elements that are void of optical elements on the ends. During the application step, the glass spheres are at a temperature below the temperature of the extruded rods. This method does not achieve good embedment as defined herein, although coverage is generally adequate. Furthermore, the process of Rideout is difficult to scale up. For example, a hot, partially molten, strand of core material is generally quite weak and breaks during processing.

The core thermoplastic elements are typically in contact with the mobile bed of optical elements for a time sufficient to coat the optical elements onto the surface of the core elements. Typically, this is at least about 30 seconds. Preferably, the core thermoplastic elements are in contact with the mobile bed of optical elements for a time sufficient to produce effective optical element embedment. This is typically at least about two minutes, and preferably at least about four minutes. The optical elements are generally in contact with the core thermoplastic elements for no more than about ten minutes. If the dwell time is too much longer than this, deformation, melting, agglomeration, etc., of the core elements can occur.

The ratio of optical elements compared to core thermoplastic elements is preferably at least about 100:1 by weight, more preferably at least about 40:1 by weight, and most preferably at least about 10:1. Generally, the higher the ratio of optical elements to core thermoplastic elements, the easier is the process. However, there shouldn't be such a large excess of optical elements that they are wasted or damaged as a result of repeated recycling. What is needed is a sufficient number of optical elements to keep the core thermoplastic elements from agglomerating and/or fusing to the equipment.

The process of attaching and embedding the optical elements in the core elements can be accomplished through a batch process or a continuous process. Such processes can be accomplished using a rotary kiln, a fluidizing chamber, a mixer, a tumbler, etc. Preferably, the process of attaching and embedding the optical elements into the core elements is carried out in a continuous manner. This can be accomplished using a rotary kiln. The conditions of rotation, kiln rise, air flow, etc. can be varied by one of skill in the art to produce the appropriate dwell times for the materials used.

Applications

The retroreflective elements of the present invention can be dropped or cascaded onto liquid applied coatings such as wet paint, thermoset materials, or hot thermoplastic materials. Hot-melt applied thermoplastic markings are described in U.S. Pat. Nos. 3,849,351; 3,891,451; 3,935,158; and 3,988,645, the disclosures of which are incorporated herein by reference. Other liquid applied coatings are disclosed in U.S. Pat. Nos. 2,043,414; 2,440,584; 4,203,878; and 4,856,931, the disclosures of which are incorporated herein by reference. In these applications, the paint or thermoplastic material forms a matrix that serves to hold the retroreflective elements in a partially embedded and partially protruding orientation. The matrix can be formed from durable two component systems such as epoxies or polyurethanes, or from thermoplastic polyurethanes, alkyds, acrylics, polyesters, and the like. Alternative coating compositions that serve as a matrix and include the retroreflective elements described herein are also contemplated to be within the scope of the present invention.

Typically, the retroreflective elements of the present invention are applied to a roadway or other surface through the use of conventional delineation equipment. The retroreflective elements are dropped from a random position onto the surface, and each element comes to rest with one of its faces disposed in a downward direction such that it is embedded in the paint, thermoplastic material, etc. If differently sized retroreflective elements are used, they are typically evenly distributed on the surface. When the paint or other film-forming material is fully cured, the retroreflective elements are firmly held in position to provide an extremely effective reflective marker.

The retroreflective elements of the present invention can also be used on preformed tapes used as pavement markings.

The following examples illustrate various specific features, advantages, and other details of the invention. It is to be understood, however, that the particular ingredients and amounts used as well as other conditions and details are not to be construed in a manner that would unduly limit the scope of this invention. Percentages given are by weight.

EXAMPLES

Example 1

Pellets of the following materials were mixed by tumbling: 400 g NUCREL 699 ethylene/methacrylic acid copolymer ("EMAA" available from DuPont Company, Polymer Products Department, Wilmington, Del.); 250 g of a color concentrate that includes 50% rutile $TiO_2$ in 40.8% NUCREL 699 with 8.9% AC540, a low molecular weight ethylene acrylic acid processing aid (available from Allied Signal), 0.2% CHIMASORB 944, and 0.1% IRGANOX 1010; 250 g of a color concentrate that includes 30% Pigment Yellow 191 in 60.8% NUCREL 699 with 8.9% AC540, 0.2% CHIMASORB 944, and 0.1% IRGANOX 1010; 100 g of a color concentrate that includes 25% Pigment Yellow 110 in NUCREL 699 with about 10% AC16, a low molecular weight polyethylene resin (available from Allied Signal), and about 0.05% IRGAFOS 168 (available from Allied Signal).

The mixed pellets were fed through a small twin-screw extruder (Baker-Perkin Model No. 60007 having 12 inch long by 1 inch diameter (30.5 cm×2.5 cm) screws), and through a die with an opening of about 0.12 inch diameter (0.3 cm) to mix the materials and form a strand from the material. The strand was extruded at a temperature of about 130° C. and 25 revolutions per minute (rpm), cooled in a water bath at a temperature of about 50° C., and wound to a spool at a rate that matched the extrusion rate. The strand was subsequently pelletized to about 0.12 inch (0.3 cm) long cylindrical pellets using a Conair Jetro Pelletizer Model 304. The pellets were fed through a rotary kiln at approximately 185° C. with a large quantity of yellow ceramic beads (which were made generally according to Example 4 of U.S. Pat. No. 4,564,556, which is incorporated herein by reference, with the addition of 1% $Fe_2O_3$ using ferric nitrate to the nitrate stabilized zirconium sol) having a refractive index of about 1.75. Initially, the ceramic beads were at room temperature; however, they were coated on the core thermoplastic elements (i.e., pellets) more effectively if the ceramic beads were at a temperature higher than the temperature of the core thermoplastic elements. In this example, the ceramic beads were eventually heated to a temperature of about 205°–215° C. The beads had been earlier treated with an aminosilane coupling agent (A 1100 Silane available from Union Carbide Company), as disclosed in U.S. Pat. Nos. 5,124,178 and 5,094,902, which are incorporated herein by reference, to aid their bonding to the resin. The ratio of feed rate of ceramic beads compared to resin pellets was 40:1 by weight, which was a sufficient amount of beads to keep the thermoplastic elements from agglomerating and/or melting/fusing together or to the equipment. The pellets were in the rotary kiln for about 4 minutes. The rotary kiln was tipped at an angle of about 5.5 degrees from horizontal to maintain a sufficient residence time (at least 2 minutes). The excess beads were collected and recycled. The resultant retroreflective elements were roundish, but not perfect spheres with ceramic beads covering the entire surface of each element.

Example 2

Pellets of the following materials were mixed by tumbling: 600 g NUCREL 699 and 400 g the color concentrate that includes 50% TiO$_2$ in NUCREL 699 listed in Example 1. The pellets were fed through a small twin-screw extruder and through a die as in Example 1. The extruded strand was fed directly to a pelletizer after going through a cooling bath. The pellets were later fed through a rotary kiln at 205°–215° C. along with clear ceramic beads (which were made generally according to Example 4 of U.S. Pat. No. 4,564,556) having a refractive index of about 1.75. These beads also had been pretreated with an aminosilane coupling agent to enhance bonding of the bead surface to the resin as described in Example 1. The beads were not initially heated, but produced more fully coated thermoplastic elements once they became hot. The ratio of feed rate of ceramic beads compared to resin pellets was varied from about 40:1 to about 10:1, all of which produced well coated thermoplastic elements. The kiln was tipped at about 5.5 degrees from horizontal and the excess beads were collected and recycled. The thermoplastic elements were in contact with the optical elements for about four minutes. The resultant retroreflective elements were rounded in shape.

Example 3

Pellets of the following materials were mixed by tumbling: 50 wt-% PRIMACOR 3440 ethylene/acrylic acid copolymer ("EAA" available from Dow Chemical Company, Midland, Mich.), 50 wt-% of a color concentrate that includes 50 wt-% rutile TiO$_2$, 12.5 wt-% of a low molecular weight polyethylene (available under the tradename AC16 from Allied Signal), 0.05 wt-% of an antioxidant (available under the tradename IRGAFOS 168 from Ciba Geigy), and 37.45 wt-% PRIMACOR 3440. The mixed pellets were further compounded as described in Example 1 using the small twin-screw extruder and formed into a strand. The strand was later pelletized and the pellets coated with ceramic beads using the rotary kiln but using a temperature of about 275° C. (±15 degrees) to accommodate sinking of beads into the higher melting resin used in this example. The pellets changed immediately upon heating in the kiln from a narrow cylindrical shape to a flattened disk shape. The ratios, by weight, of the pellets and beads were the same as in Example 2, and the beads used were also the same type and had the same treatment as those in Example 2; the angle of the kiln was also the same and excess beads were again collected and recycled. The resultant retroreflective element a small generally flat disks.

Example 4

A small quantity of NUCREL 699 resin and Exterior MEARLIN Pearlescent, Fine Pearl Pigment (containing mica, titanium dioxide, tin oxide, and chromium hydroxide), obtained from the Mearle Corporation, New York, N.Y., were mixed in a metal container at a ratio of 90% resin to 10% pigment. The metal container and its contents were heated in a convection oven until the resin melted. The pigment and resin were then mixed with a stirrer and cast onto a release liner. The resin quickly became solid again at room temperature. Some time later (several days) the resin was cut into small pieces of random and irregular shapes ranging from about 0.31–0.95 cm across at the widest point. Each piece was about 0.16 cm thick. These pieces were then placed into the rotary kiln with ceramic beads of a refractive index of about 1.92, as described in U.S. Pat. No. 4,772,511. These elements, based on the NUCREL 699 resin which typically tends toward a rounded shape when formulated with other pigments, maintained the shape to which they had been cut when prepared with this resin and pigment combination and with this method. They were also much brighter than the other pellets.

Example 5

This sample contained a core pellet of 35% TiO$_2$ and 65% EMAA (NUCREL 699) prepared by tumble mixing 1200 g of NUCREL 699 pellets and 2800 g of the color concentrate used in Example 1 (50% TiO$_2$ in NUCREL 699) followed by extruding the mixture with a 1.25 inch (3.2 cm) Killion single screw extruder (available from Killion, Verona, N.J.) having a temperature profile of 220° F. (104° C., zone 1), 230° F. (110° C., zone 2), 250° F. (121° C., zone 3), 260° F. (127° C., zone 4), 280° F. (138° C., zone 5), to form a 0.12 inch (0.3 cm) diameter strand using a 17 fpm (feet per minute, 5.2 meters per minute) winder speed and a 30 rpm screw speed. The strand was then cut into 0.12 inch (0.3 cm) pellets. These pellets were then added at room temperature to a fluidized bed of hot (about 170° C.) 1 mm diameter VISI glass beads having a refractive index of 1.5 (available from Potter Industries, Hasbrouck, N.J.). The resultant retroreflective elements were slightly rounded. These beads were generally too large to embed well into the core element.

Example 6

This sample contained a core pellet containing 35% TiO$_2$ and 65% EMAA prepared as described in Example 5. These pellets were added at room temperature to a fluidized bed of a hot (about 170° C.) mixture of FLEX-O-LITE glass beads having a refractive index of 1.9 (available from Flexolite, Paris, Tex.) and skid-resistant ceramic particles (which were made according to Example 1 in U.S. Pat. No. 5,094,902). The mixture contained 95% glass beads having a diameter of about 250–400 micrometers and 5% skid-resistant particles having a diameter of about 250–400 micrometers. The ratio of glass beads to core pellets was about 100:1. The beads and pellets were in contact for about 30 seconds to form slightly rounded retroreflective elements with a monolayer of tightly packed beads and skid-resistant particles.

Example 7

This sample contained a core pellet containing 35% TiO$_2$ and 65% EMAA prepared as described in Example 5. These pellets were added at room temperature to a fluidized bed of hot (about 170° C.) FLEX-O-LITE glass beads described in Example 6 but without the skid-resistant particles. The resultant elements were slightly rounded with a tightly packed monolayer of beads.

Example 8

This sample contained a core material of cut pieces from a laminate containing validation retroreflective sheeting (commercially available from 3M Company, St. Paul, Minn., under the trade name SCOTCBLITE) previously laminated to one side of 50 mil (0.13 cm) thick pigmented extruded film containing 20% TiO$_2$ and 80% EMAA (prepared from NUCREL 699 and the 50% TiO$_2$ color concentrate used in Example 1). During the bead coating process as defined in Example 7, the hot beads became attached to all exposed surfaces of the pigmented film while the reflective sheeting remained free of beads due to a thermoset top film in the sheeting. Also depending on how the pieces were cut, they become reshaped as the thermoplastic pigmented core element shrunk under heat in the down web direction from its previous film extrusion process. This resulted in element becoming dome shaped. This combination exposed bead/enclosed lens element has some gains towards daytime color in addition to providing an effective wet reflective element.

Example 9

This sample contained a core pellet 35% $TiO_2$, 35% EMAA (NUCREL 699), and 30% EAA (PRIMACOR 5980). This was made using the 50% $TiO_2$ color concentrate described in Example 1. These pellets were added at room temperature to a fluidized bed of hot (about 170° C.) 1.9 index glass beads near 250–400 micrometer diameter. The technique of adding cool/solid thermoplastic elements to a mobile bed of hot beads allowed immediate partial bead attachment to all available surface are of the thermoplastic. Further heating (near 30 seconds) allowed the beads to sink to an appropriate level in the resin and bond firmly thereon. The monolayer of beads together with movement of the elements within a fluidized bed prevented the elements from melting together during this process. The core pellet produced a flat disk shape with a generally tightly packed monolayer of beads that were partially embedded in the surface of a pigmented thermoplastic core. This disk shape was the result of the pellet shrinking under heat in the downweb direction from its previous strand extruding operation.

Example 10

A mixture consisting of 35% TiO2, 30% NUCREL 699 EMAA, and 35% PRIMACOR 3150 EAA was extruded using a 1.25-inch diameter Killion extruder of 24 L/D (length to diameter) with the temperature profile described in Example 5. This was made using the 50% $TiO_2$ color concentrate described in Example 1. The diameter of the extruded strand was set at about 0.12 inch (0.3 cm) by setting the winder speed at 17 fpm (5.1 meters/minute) and the screw speed at 30 rpm. The strand was cut into pellets of about 0.12 inch (0.3 cm) in length. A fluidized bed of ceramic beads used in Example 2 surface-treated with A-1100 aminosilane (γ-aminopropyltriethoxysilane, available from Union Carbide, Danbury, Conn.) was heated to a temperature of about 170°–180° F. (77°–82° C.). The pellets were introduced into the heated, fluidized bed (about 170° C.) of beads and allowed to tumble for about one minute to attach and embed the beads to the surface of the pellets. The pellets went through a shape transformation forming disk-shaped beaded elements. The "diameter" was more than about 3 times the height of the pellet.

Example 11

A mixture of about 90% Dow PRIMACOR 3440 and 10% MEARLIN Pearlescent Pigment, Fine Pearl, were compounded in a Baker-Perkin twin screw extruder, Model 60007. The extruded mixture was formed as a strand but some of the material was forced into other flattened and random shapes while the resin was still plastic. The melt temperature was about 210° C. during compounding. Samples of the material were cut into various shapes. They were then bead-coated, using a fluidized bed of ceramic, surface treated beads at about 80° C. The lengthwise dimension of the elements were shortened slightly, but he flattened strands remained flat and the pieces cut into tranfuilar and other shapes maintained those shapes.

Example 12

Using a Baker-Perkin, model 60007, co-rotating twin-screw extruder, the following materials were compounded together: 21% VOLAN surface-treated glass beads of about 60 micrometer diameter and having a refractive index of 1.9; 39% PRIMACOR 3440 EAA resin; 39% PRIMACOR 3440 EAA resin pre-compounded with $TiO_2$ at a ratio of about 50:50. The extruder screw speed was 42 rpm and the melt temperature of the materials in the extruder was about 210° C. A simple die with an orifice of about 2.5 mm was used and the strand was wound at a speed of about 18 feet per minute (5.5 meters per minute). The bead containing strand was subsequently pelletized using a Conair JETRO Pelletizer Model 304. Bead-coating was done using a rotary kiln tilted at about 5.5 degrees from horizontal. The temperature of the kiln was set at about 275°–280° C. The residence time in the kiln was about 4 minutes. The beads were surface-treated ceramic beads as used in Example 2 having a refractive index of 1.75 and a diameter of about 170–230 micrometers. The weight ratio of the beads being coated to pellets being used was about 12:1.

Example 13

A retroreflective element was made using a thermoset resin in combination with a thermoplastic resin by extruding a strand from 25% NUCREL 699 ethylene/methacrylic acid copolymer, 50% of the color concentrate used in Example 1 that includes 50% $TiO_2$ in 40.8% NUCREL 699, 19% BF1540 blocked isophorone diisocyanate (available from Huls America), and 6% tris-2-hydroxyethyleisocyanurate (available from BASF). A Perkin-Elmer twin screw extruder was used at 26 rpm and a temperature of about 130°–140° C. The strand was cooled in a water bath and pelletized using a JetAir pelletizer. The pellets formed were later fed into a rotary kiln with the ceramic beads used in Example 2 in a weight ratio of 12:1 (beads: pellets). The kiln temperature was about 210° C. The dwell time in the kiln was about 4 minutes. The cylindrically shaped pellets became rounded upon the application of the beads.

Various modifications and alterations will become apparent to those skilled in the art without departing from the spirit and scope of this invention.

What is claimed is:

1. A process of preparing a retroreflective element comprising:
   (a) combining a bed of optical elements and one or more core elements comprising a thermoplastic material wherein the ratio of the diameter of the optical elements to the diameter of the core elements is no greater than about 1:2; and
   (b) agitating the combination of optical elements and core elements for a sufficient period of time and at a sufficient temperature to coat the optical elements onto the core elements to form one or more retroreflective elements.

2. The process of claim 1 wherein the step of agitating is carried out for a time and at a temperature sufficient to embed the optical elements into the core elements to an average depth of at least about 50% of the average diameter of the optical elements.

3. The process of claim 2 wherein the optical elements are heated to a temperature at least about the tackifying temperature of the core elements prior to the step of combining.

4. The process of claim 3 wherein the optical elements are heated to a temperature at least about 10° C. higher than the tackifying temperature of the core elements.

5. The process of claim 1 wherein the core elements further comprise a thermoset resin.

6. The process of claim 1 wherein the optical elements and core elements are combined in a weight ratio of at least about 100:1.

7. The process of claim 1 wherein the core elements comprise substantially cylindrical pellets that become substantially disk-shaped upon coating with the optical elements.

8. The process of claim 7 wherein the core elements comprise a copolymer of ethylene and acrylic acid.

9. The process of claim 7 wherein the core elements comprise a copolymer of ethylene and methacrylic acid.

10. The process of claim 1 wherein the core elements comprise substantially cylindrical pellets that become substantially spherical upon coating with the optical elements.

11. The process of claim 10 wherein the core elements comprise a copolymer of ethylene and acrylic acid.

12. The process of claim 10 wherein the core elements comprise a copolymer of ethylene and methacrylic acid.

13. The process of claim 1 wherein the core elements further comprise a pigment.

14. The process of claim 1 comprising:

(a) heating a mobile bed of optical elements; and (b) adding one or more core elements comprising a thermoplastic material to the mobile bed of optical elements; wherein the optical elements are initially heated to a temperature at least about the tacking temperature of the core elements.

15. The process of claim 14 wherein the temperature of the optical elements is at least about 25° C. higher than the tackifying temperature of the core elements.

16. The process of claim 14 carried out in a continuous manner.

17. The process of claim 16 wherein the mobile bed of optical elements is formed in a rotary kiln.

18. The process of claim 14 wherein the mobile bed of optical elements is formed in a fluidizing chamber.

19. The process of claim 1 wherein the core elements change shape upon coating with the optical elements.

20. The process of claim 1 wherein the core elements do not substantially change shape upon coating with the optical elements.

21. The process of claim 20 wherein the core elements further comprise plate-like pigment particles.

22. The process of claim 1 wherein the core elements are prepared by a process comprising:

(a) extruding the thermoplastic material into a strand;

(b) cooling the strand of thermoplastic material; and (c) cutting the strand of thermoplastic material into core elements.

* * * * *

UNITED STATES PATENT AND TRADEMARK OFFICE
CERTIFICATE OF CORRECTION

PATENT NO.: 5,750,191
DATED: May 12, 1998
INVENTOR(S): Kathleen A. Hachey, et al It is certified that error appears in the above-identified patent and that said Letters Patent is hereby corrected as shown below:

On title page, item [75] change "Beseup" should read —Bescup—

In Column 4, line 39 "Minn" should be — Mich —

In Column 5, line 50 "diff-use" should be — diffuse —

In Column 7, line 35 "gembedded" should be — embedded —

In Column 10, line 16 "IPGANOX" should be — IRGANOX —

In Column 11, line 45 "element a small" should be — elements were —

In Column 12, line 55 "SCOTCBLITE" should be — SCOTCHLITE —

In Column 13, line 14 "are" should be — area —

In Column 13, line 61 "he" should be — the —

In Column 13, line 62 "tranfuilar" should be — triangular —

In Column 15, line 23 "tacking" should be — tackifying —

Signed and Sealed this

Eighth Day of September, 1998

Attest:

BRUCE LEHMAN

*Attesting Officer*  *Commissioner of Patents and Trademarks*